US010318161B2

(12) United States Patent
Lublin et al.

(10) Patent No.: US 10,318,161 B2
(45) Date of Patent: Jun. 11, 2019

(54) VIRTUAL MACHINE INITIATED MEMORY DEDUPLICATION

(71) Applicant: Red Hat Israel, Ltd., Raanana (IL)

(72) Inventors: Uri Lublin, Raanana (IL); Michael Tsirkin, Raanana (IL)

(73) Assignee: RED HAT ISRAEL, LTD., Raanana (IL)

( * ) Notice: Subject to any disclaimer, the term of this patent is extended or adjusted under 35 U.S.C. 154(b) by 74 days.

(21) Appl. No.: 15/186,621

(22) Filed: Jun. 20, 2016

(65) Prior Publication Data

US 2017/0364263 A1 Dec. 21, 2017

(51) Int. Cl.
*G06F 12/00* (2006.01)
*G06F 3/06* (2006.01)
*G06F 9/455* (2018.01)

(52) U.S. Cl.
CPC ............ *G06F 3/061* (2013.01); *G06F 3/0641* (2013.01); *G06F 3/0664* (2013.01); *G06F 3/0665* (2013.01); *G06F 3/0673* (2013.01); *G06F 9/45558* (2013.01); *G06F 2009/45583* (2013.01)

(58) Field of Classification Search
CPC ...... G06F 3/061; G06F 3/0641; G06F 3/0664; G06F 3/0665
See application file for complete search history.

(56) References Cited

U.S. PATENT DOCUMENTS

| | | | |
|---|---|---|---|
| 7,567,188 B1 | 7/2009 | Anglin et al. | |
| 8,095,756 B1* | 1/2012 | Somavarapu | ....... G06F 11/1453 711/162 |
| 8,412,848 B2 | 4/2013 | Therrien et al. | |
| 8,898,114 B1 | 11/2014 | Feathergill et al. | |
| 8,909,845 B1 | 12/2014 | Sobel et al. | |
| 8,935,506 B1 | 1/2015 | Gopalan | |
| 9,053,053 B2 | 6/2015 | Bacher et al. | |
| 2010/0077013 A1 | 3/2010 | Clements et al. | |
| 2013/0262404 A1* | 10/2013 | Daga | ................ G06F 17/30156 707/692 |
| 2015/0007170 A1* | 1/2015 | Tsirkin | ................ G06F 9/45533 718/1 |
| 2015/0052323 A1 | 2/2015 | Noel et al. | |

OTHER PUBLICATIONS

Frank Bellosa et al. "Deduplication in VM Environments" http://www.cl.cam.ac.uk/research/srg/netos/seminars/slides/Dedup_VM_Miller_Bellosa.pdf, Karlsruhe Institute of Technology (KIT)—System Architecture Group, accessed May 6, 2016, 29 pages.

Konrad Miller et al. "XLH: More Effective Memory Deduplication Scanners Through Cross-Layer Hints" https://www.usenix.org/system/files/conference/atc13/atc13-miller.pdf, Karlsruhe Institute of Technology (KIT), 2013, 12 pages.

* cited by examiner

*Primary Examiner* — Gurtej Bansal
(74) *Attorney, Agent, or Firm* — Haynes and Boone, LLP (57) ABSTRACT

Methods, systems, and computer program products are included for initiating deduplication of memory by virtual machine guests. A method includes providing a virtual machine, by a hypervisor, and running a guest on the virtual machine. The guest sends the hypervisor a scan indicator based on an amount of the virtual machine's memory that has been modified. Responsive to the scan indicator, the hypervisor triggers memory scanning and deduplication of memory pages that are identified by the memory scanning as storing identical content.

20 Claims, 5 Drawing Sheets

VIRTUAL MACHINE INITIATED MEMORY DEDUPLICATION

FIELD OF DISCLOSURE

The present disclosure generally relates to electrical computers and digital data processing, and more particularly relates to memory management.

BACKGROUND

A virtual machine is software that is executed on hardware to create a virtualization of a physical computer system. Virtual machines may function as self-contained platforms that run their own operating systems and software applications.

A host machine may concurrently run one or more virtual machines using software that is referred to as a hypervisor. The hypervisor allocates a certain amount of the host machine's resources, such as the host machine's underlying physical processors and memory devices, to each of the virtual machines. This allocating by the hypervisor allows guests of the virtual machines to transparently access the host machine's resources.

Guest applications, including guest operating systems, may be executed on the allocated resources of each virtual machine. Local or remote clients may access these guest applications to perform computing tasks. In some instances, virtual machines and guest applications may be implemented to provide cloud computing environments.

Memory of a host machine and virtual machines running on the host machine is typically divided into memory pages. In some host machines, the hypervisor reduces physical memory consumption by using memory deduplication techniques to reduce the amount of memory pages that store the same data.

Traditionally, memory deduplication is performed by the hypervisor scanning memory pages assigned to virtual machines to identify memory pages that store the same content. The hypervisor consolidates memory pages that store the same content into a single memory page, thereby reducing the amount of memory resources used by the virtual machines.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Traditionally, hypervisors perform memory deduplication on a periodic basis. Performing memory deduplication on a periodic basis results in the frequency of memory deduplication not being aligned with the speed at which duplicate memory pages are created in guest memory of the virtual machines. If memory deduplication is performed too frequently then relatively few duplicate memory pages may be located. If few duplicates are located, the relatively low memory savings obtained by deduplicating these duplicate memory pages may not justify the processing resources used to perform the memory scanning. On the other hand, performing memory deduplication too infrequently may allow duplicate memory pages to build up in memory, thus causing memory pressure that results in virtual machines and/or the host machine running out of memory. The techniques provided herein balance memory and processing costs to mitigate such issues by aligning the frequency of memory deduplication operations with the speed at which duplicate memory pages are created.

Various examples described herein provide one or more virtual machine guests that monitor modification of memory and initiate memory deduplication based on the amount of memory that has been modified. Because memory modifications may result in the creation of duplicate memory pages, guests running on virtual machines provide scan indicators to the hypervisor that indicate the amount of memory that has been modified. Accordingly, the hypervisor may align the frequency of memory deduplication operations based on these scan indicators. For example, a virtual machine guest modifying a relatively large amount of memory may cause the virtual machine guest to send a scan indicator to the hypervisor that instructs the hypervisor to perform memory deduplication. Or, if a relatively small amount of memory is modified on a virtual machine, the absence of scan indicators may indicate to the hypervisor that memory deduplication operations may be delayed.

The hypervisor may also tailor the performance of memory deduplication operations based on specific types of usage of the memory pages. For example, virtual machine guests may identify to the hypervisor read-only and read-mostly memory pages that are good candidates for deduplication. Memory pages that are often modified may not be efficient to deduplicate because such memory pages may again be duplicated when they are modified. Thus, any memory savings from deduplicating these memory pages may be minimal and not an efficient use of processing resources. Accordingly, the virtual machine guests and/or hypervisor may tailor memory deduplication operations to target read-only and read-mostly memory pages for additional efficiency gains.

Moreover, virtual machine guests may identify to the hypervisor particular memory pages that have been modified. Virtual machine guests may identify these memory pages to the hypervisor, via the scan indicators, such that the hypervisor may target the modified pages for deduplication. For example, rather than comparing all of a virtual machine's memory with another virtual machine's memory to detect duplicate memory pages, the hypervisor may compare only the modified memory pages of a virtual machine with all or a portion of the memory pages from other virtual machines, thus reducing the number of memory pages that are scanned. This technique may reduce processing costs associated with the memory scanning and thereby also provide improved memory scanning speeds.

These techniques are beneficial and advantageous for improving processing efficiency and performance while at the same time improving memory usage. Of course, it is understood that these features and advantages are shared among the various examples herein and that no one feature or advantage is required for any particular example.

Figure 1:
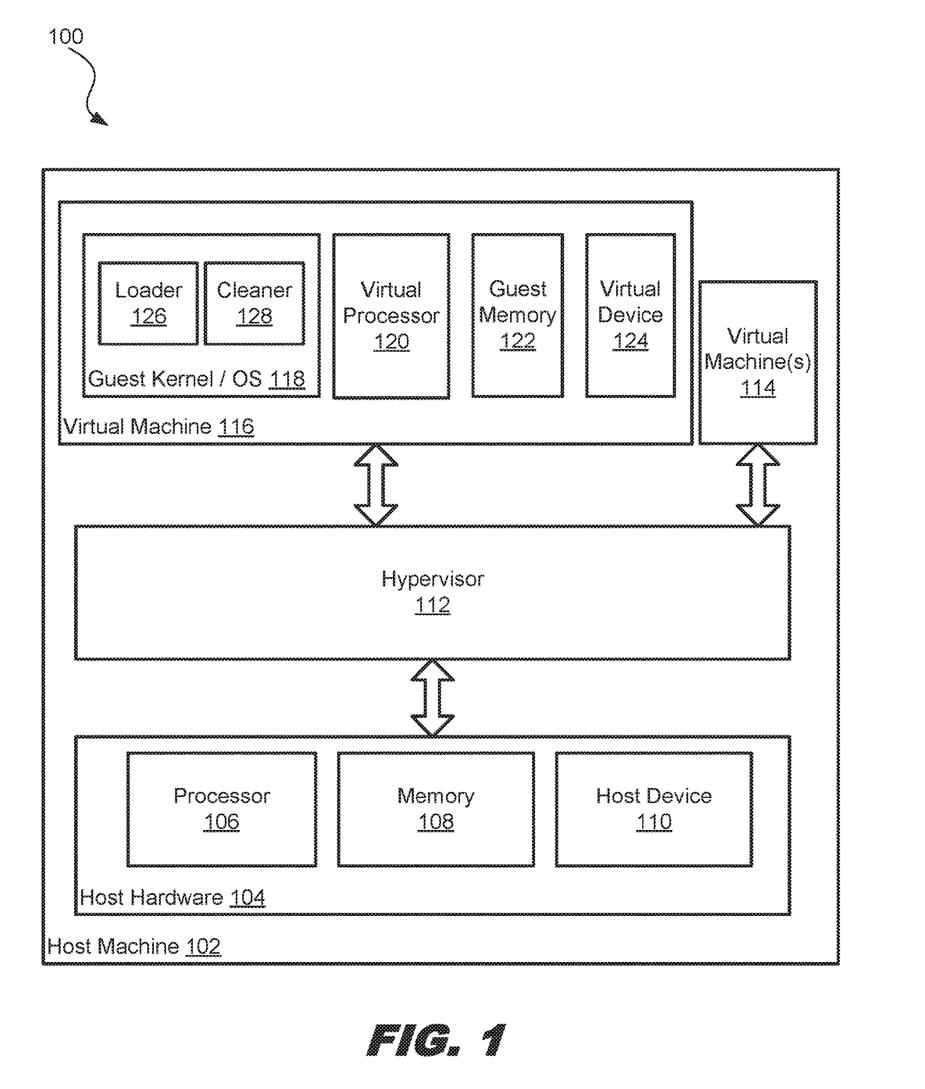
FIG. 1 is an organizational diagram illustrating a virtualized computing system that performs memory deduplication, in accordance with various examples of the present disclosure.

FIG. 1 is an organizational diagram illustrating a virtualized computing system 100 that performs memory deduplication, in accordance with various examples of the present disclosure.

The system 100 includes a host machine 102. The host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The host machine 102 includes host hardware 104. Host hardware 104 includes physical elements such as a processor 106, a memory 108, and a host device 110. While one of each of these elements is illustrated for the purposes of simplicity, in some examples more than one of each of these hardware elements may be included. For example, the host hardware 104 may include a plurality of processors as well as various types of memory and host devices.

In the present example, the processor 106 is structured to include one or more general-purpose processing devices such as a microprocessor, central processing unit, and the like. More particularly, the processor 106 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor 106 is structured to include one or more special-purpose processing devices such as an application specific integrated circuit (ASIC), a field programmable gate array (FPGA), a digital signal processor (DSP), network processor, and so forth. The processor 106 executes instructions for performing the operations, steps, and actions discussed herein.

In the present example, the memory 108 is structured to include at least one computer-readable storage medium on which is stored one or more sets of instructions (e.g., software) embodying any one or more of the methodologies or functions described herein. The memory 108 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory computer-readable medium that are executable by the processor 106.

In the present example, the host device 110 is structured to include at least one hardware device, such as a network interface card, wireless adapter card, audio/sound card, graphics card, storage adapter, or other hardware device. In some examples, these hardware devices are coupled to a PCI bus provided by the host hardware 104. In other examples, hardware devices are integrated into a motherboard provided by the host hardware 104.

The processor 106, memory 108, and host device 110 hardware elements of the host hardware 104 may be communicatively coupled via one or more buses. The host hardware 104 also may include other hardware elements, such as a video display unit (e.g., a liquid crystal display (LCD) monitor), alphanumeric input device (e.g., a keyboard), cursor control device (e.g., a mouse), signal generation device (e.g., a speaker), and so forth.

The host machine 102 includes a hypervisor 112, which also may be referred to as a virtual machine monitor, virtual machine manager, and/or VMM. The hypervisor 112 may include executable instructions that are stored in the memory 108 and executed by the processor 106 to provide one or more virtual machines (e.g., virtual machine 116 and one or more other virtual machines 114, which may be structured similarly to virtual machine 116).

In some examples, the hypervisor 112 is run on top of a host operating system and host kernel. In other examples, the hypervisor 112 is run directly on host hardware 104 without the use of a host operating system. The hypervisor 112 may also be structured to use or include functions provided by a host operating system and/or host kernel. For example, the kernel may provide kernel modules, such as Kernel Same-Page Merging (KSM), that include functions for scanning memory and merging duplicate memory pages. The hypervisor 112 may use such functions to manage virtual machines, resources provided to virtual machines, and otherwise control operations corresponding to virtual machines. Accordingly, these functions may be considered to be part of the hypervisor. In other examples, functionality for performing deduplication may be included in the hypervisor while being stored in a memory space that is external to a host kernel and/or host operating system.

In the present example, hypervisor 112 is structured to include instructions that are executed to provide one or more virtual machines 114 and a virtual machine 116. The virtual machine(s) 114 may include components similar to those illustrated with respect to virtual machine 116, such as a kernel, operating system, virtual processor, guest memory, virtual device, and so forth.

The hypervisor 112 is structured to provide the virtual machine 116 by virtualizing at least a portion of the host hardware 104. The hypervisor 112 may provide the virtual machine 116 by performing a hardware emulation, full virtualization, para-virtualization, and/or operating systemlevel virtualization corresponding to the host machine 102. In some examples, hypervisor 112 is structured to rely upon, use, or include features provided by a kernel and/or operating system running on the host machine 102. In these examples, the hypervisor 112 may call one or more memory deduplication functions that are provided by a host machine 102 kernel that runs underneath the hypervisor 112. Accordingly, the hypervisor 112 is structured to provide the memory deduplication features.

The hypervisor 112 manages system resources, including providing access of guests (e.g., guest applications such as operating systems, kernels, user applications, and so forth) of the virtual machine 116 to the host hardware 104, such as the processor 106, the memory 108, and the host device 110. In the present example, the system resources that are provided to the guests of the virtual machine 116 include a virtual processor 120 that is mapped to the processor 106, the guest memory 122 that is mapped to at least a portion of the memory 108, and a virtual device 124 that corresponds to the host device 110.

The hypervisor 112 is structured to receive scan indicators from one or more guests of the virtual machines (e.g., virtual machine 116) corresponding to modifying of memory pages that are included in the guest memories (e.g., guest memory 122). These scan indicators may, for example, include ranges of memory pages modified, amounts of memory pages modified, notifications to perform memory deduplication, and so forth. Based on these received scan indicators, the hypervisor 112 is structured to trigger memory deduplication techniques, such as scanning the memory 108 to identify memory pages that store identical data, merging the identified memory pages, referencing the merged memory pages by multiple virtual machines, marking each merged memory page copy-on-write (COW), and in the event that merged memory pages are modified, creating separate copies of the merged memory pages to store any modifications.

In the present example, the virtual machine 116 includes a guest kernel/operating system (OS) 118. The guest kernel/operating system 118 may be structured to include a kernel as well as an operating system that runs on top of the kernel. However, in other examples, the guest kernel/operating system 118 may include a stand-alone kernel that does not have an operating system running on top of the kernel.

The kernel of the virtual machine 116 provides core computing functionality to the virtual machine 116. For example, a kernel manages important tasks of the virtual machine 116, such as allocating memory pages of the guest memory 122 to virtual machine processes and/or threads, communicating I/O to and from the virtual device 124, managing a file system, handling interrupts, scheduling and running processes to execute instructions of computing tasks by the virtual processor 120, providing an interface between devices and software applications, and/or providing other important computing features.

A guest operating system of the virtual machine 116 may run on top of the kernel to provide additional interfaces and functionality on the virtual machine 116 beyond those offered by the kernel. The guest operating system may include, for example, RED HAT ENTERPRISE LINUX, FEDORA, WINDOWS, OS X, IOS, ANDROID, or other operating system. In some examples, the virtual machine 116 may be structured to include a plurality of guest operating systems that run on top of the kernel.

In the present example, the virtual processor 120 includes one or more processors that may be accessed by processes running on the virtual machine 116 to pass instructions to the processor 106 for execution. These instructions may include executable instructions stored on memory pages in the guest memory 122. For example, executable instructions may correspond to instructions of executable (binary) files and/or libraries that are executed to perform actions on the virtual machine 116.

In the present example, the guest memory 122 includes a portion of the memory 108. The guest memory 122 may include one or more ranges of memory pages that are mapped to the memory 108, such that processes running on the virtual machine 116 may access the memory 108 by accessing the guest memory 122. These ranges of memory pages may include one or more consecutive and/or non-consecutive memory ranges. Each range may include one or more memory pages. The mapping between the memory pages of the guest memory 122 and the memory pages of the memory 108 may be provided by one or more page tables of the hypervisor 112 and/or virtual machine 116.

In the present example, the virtual device 124 is a virtual representation of the host device 110. The hypervisor 112 may expose the host device 110 to the virtual machine 116 to allow the virtual machine 116 to create the virtual device 124 that corresponds to the host device 110. Accordingly, the hypervisor 112 and virtual machine 116 may create a virtual device 124 that represents the host device 110. The virtual device 124 may be accessed by the virtual machine 116 and/or guest kernel/operating system 118 to perform I/O operations with respect to the host device 110.

In the present example, the guest kernel/operating system 118 includes a loader 126. In some examples, the loader 126 is provided by a guest operating system. The loader 126 is structured to load executable instructions into memory pages for execution. For example, the loader 126 may read executable instructions from executable files and libraries that are selected for execution. The loader 126 may then prepare these executable instructions for execution by storing the executable instructions in one or more memory pages as part of a memory page initialization process. Once the executable instructions are stored in the memory pages, a process may run that accesses the memory addresses within the memory pages to provide the executable instructions to the virtual processor 120 for execution. The loader 126 may provide scan indicators to the hypervisor 112 regarding memory pages that are modified to store the executable instructions. These scan indicators may include information corresponding to the memory pages, such as the amount of memory pages modified, memory page ranges of the modified memory pages, read-only or read-mostly status corresponding to the modified memory pages, locations of files from which executable instructions were read to load the executable instructions into the modified memory pages, and so forth.

In the present example, the guest kernel/operating system 118 includes a cleaner 128. In some examples, the cleaner 128 is provided by a guest kernel. The cleaner 128 is structured to clear the contents of memory pages. For example, the cleaner 128 may zero-out memory pages as part of a memory page initialization process by writing zeros to the memory addresses included in the memory pages. Clearing the contents of memory pages may be beneficial for enhancing security of the virtual machine 116. For example, the hypervisor 112 may share memory pages between virtual machines. Accordingly, the cleaner 128 may clear the contents of memory pages of the virtual machine 116 prior to sharing the memory pages with other virtual machines. Thus, if the memory pages are allocated for use by a second virtual machine, the second virtual machine will not have access to the data previously stored on the memory pages by virtual machine 116. The cleaner 128 may provide scan indicators to the hypervisor 112 regarding memory pages that are modified by the cleaning of the contents of the memory pages. These scan indicators may include information corresponding to the memory pages, such as the amount of memory pages modified, memory page ranges of the modified memory pages, and so forth.

Figure 2:
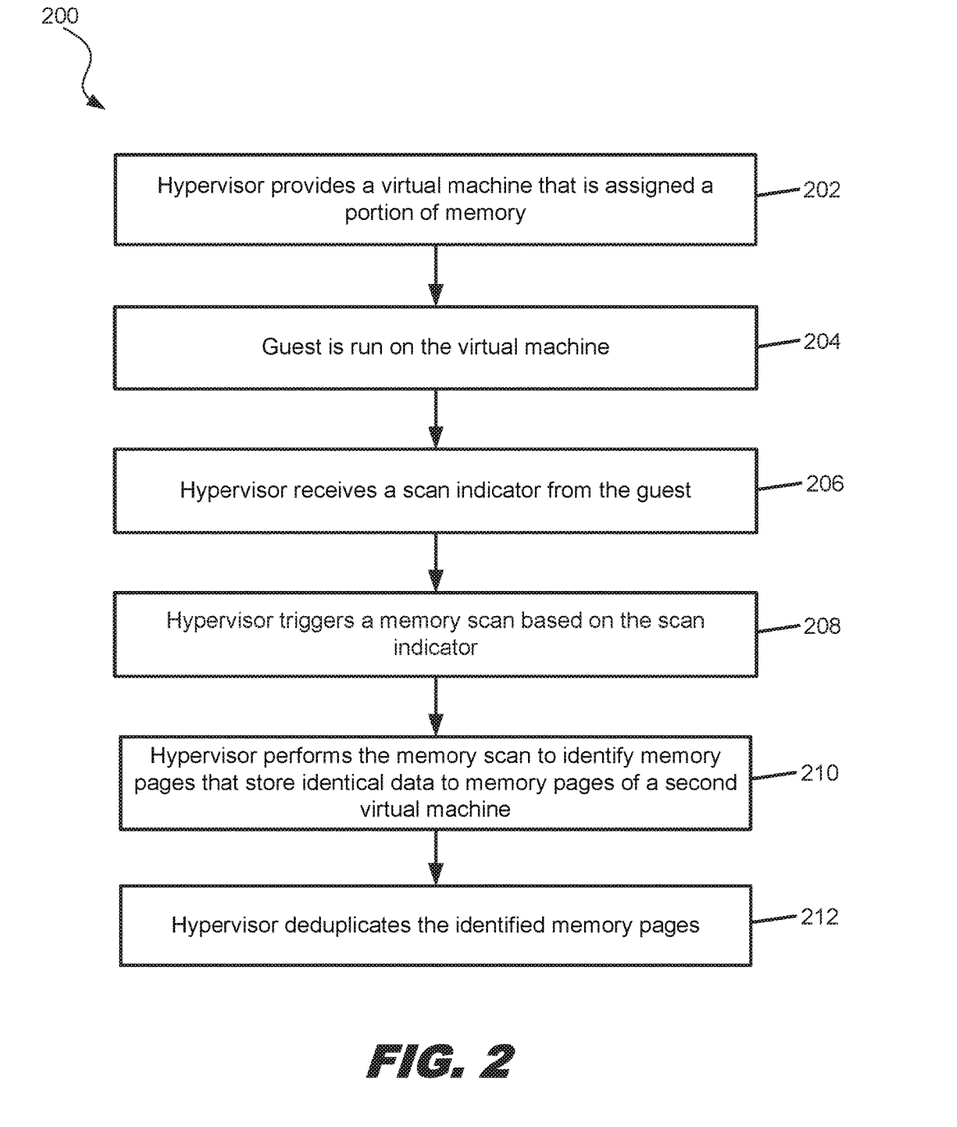
FIG. 2 is a flow diagram illustrating a method for initiating memory page deduplication by a virtual machine guest, in accordance with various examples of the present disclosure.

FIG. 2 is an organizational diagram illustrating a method 200 for initiating memory page deduplication by a virtual machine guest, in accordance with various examples of the present disclosure.

At action 202, the hypervisor provides a virtual machine that is assigned a portion of memory. In the present example, the portion of the memory assigned to the virtual machine is assigned to a different address space of a host memory than other portions of the memory that are assigned to other virtual machines provided by the hypervisor.

At action 204, the hypervisor runs at least one guest on the virtual machine. In some examples, the hypervisor runs a virtual firmware on the virtual machine. The virtual firmware boots a guest kernel and/or guest operating system. The guest kernel and/or guest operating system then may run other guest applications, such as user applications, on the virtual machine. Accordingly, the hypervisor runs guests on the virtual machine directly and/or indirectly via one or more other guests.

At action 206, the hypervisor receives a scan indicator from a guest of the virtual machine. The guest sends the scan indicator to the hypervisor after modifying one or more memory pages in the portion of memory assigned to the virtual machine. For example, a guest such as a guest operating system or guest kernel on the virtual machine may modify the one or more memory pages to load data onto the memory pages or clean the memory pages.

In some examples, the scan indicator is sent to the hypervisor via a hypercall. In other examples, the scan indicator is sent to the hypervisor via a shared memory communication channel between the virtual machine and the hypervisor. In some examples, the scan indicator includes information such as an identification of consecutive and/or non-consecutive ranges of modified memory pages. In other examples, the scan indicator includes information such as an amount of modified memory pages. The amount of memory pages may be specified as a percentage of memory modified or as a count of the number of memory pages modified.

At action 208, responsive to receiving the scan indicator, the hypervisor triggers a memory scan of the memory to identify duplicate memory pages in the portion of memory that store identical data to other memory pages that are assigned to other virtual machines. In some examples, the memory scanning is triggered by the hypervisor immediately upon receiving the scan indicator. In other examples, the hypervisor includes a periodic scanning schedule and the triggering of the memory scanning is caused by the hypervisor modifying the scanning schedule to schedule the memory scanning. For example, the hypervisor may modify the periodic scanning schedule to adjust an amount of time until a next memory scan is performed. In some examples, if the scanning indicator indicates that more than a threshold amount of memory pages have been modified, the hypervisor may reduce an amount of time until a next memory scan, thus increasing the frequency of scanning. In another example, if the scan indicator indicates that the amount of memory pages that have been modified is less than a threshold amount, the hypervisor may leave the scanning schedule unmodified or may increase an amount of time until a next memory scan is performed. Accordingly, the hypervisor adjusts the scanning frequency responsive to a scan indicator received from a guest of a virtual machine regarding memory modification.

In some examples, the hypervisor triggers memory scanning based on a plurality of scan indicators received from more than one virtual machine. The hypervisor may identify from the scan indicators an aggregate amount of memory (e.g., a total number of memory pages) that has been modified on a plurality of virtual machines since performing a last memory scan. The hypervisor may update the amount when scan indicators from virtual machine guests are received, so that the hypervisor may track memory usage across multiple virtual machines. Thus, the hypervisor may modify a memory scanning schedule or otherwise trigger memory scanning operations based on an amount of modified memory across multiple virtual machines. The hypervisor may determine when the amount of memory exceeds a preconfigured or user specified threshold, such as by comparing the threshold with the amount of memory. Based on a determination that the threshold is exceeded, the hypervisor may modify a memory scan schedule to trigger memory scanning at an earlier time and/or greater frequency. The amount of memory may be measured as a count of a number of memory pages (e.g., aggregated across the virtual machines or from a single virtual machine) or a percentage of memory. For example, the threshold may be a percentage of host memory (e.g., memory scanning is triggered when more than 1% of the host memory or of a guest memory has been modified). 1% is provided merely as an example and in other examples other thresholds may be used.

At action 210, the hypervisor performs a memory scan to identify memory pages that store identical data to other memory pages. The other memory pages may be allocated to the same virtual machine or other virtual machines. In some examples, the hypervisor performs the deduplication by scanning the memory pages of the virtual machines and comparing the scanned memory pages to locate memory pages that store identical content. In some examples, the hypervisor scans memory pages that are specifically identified in the scan indicators received from the virtual machines. For example, a virtual machine guest may specify in a scan indicator that a range of memory pages has been modified. Accordingly, the hypervisor may scan the range of memory pages and compare the contents of the range of memory pages with the contents of memory pages of other virtual machines. In other examples, the hypervisor may scan all memory pages assigned to the virtual machines.

At action 212, once the hypervisor identifies duplicate memory pages that store identical content, the hypervisor deduplicates the duplicate memory pages. In some examples, the hypervisor deduplicates memory pages by merging the duplicate memory pages, thus reducing the amount of memory pages used to store the identical content.

After merging the duplicate memory pages, the hypervisor may reset one or more amounts and/or identifiers of the ranges of memory pages modified that are maintained by the hypervisor. The hypervisor may also notify one or more virtual machine guests that the deduplication operations were performed, so that the virtual machine guests may reset any amounts and/or identifiers of the ranges of memory pages modified that are maintained on the virtual machines. Accordingly, after resetting any amounts and/or identifiers, the virtual machine guests and/or hypervisor may again increment the amounts and/or identify new ranges of modified memory pages to further adjust a time until a next memory scan is performed. Accordingly, the frequency of memory scanning and performance of deduplication operations is tailored based on the memory page modification by the virtual machine guests.

Figure 3:
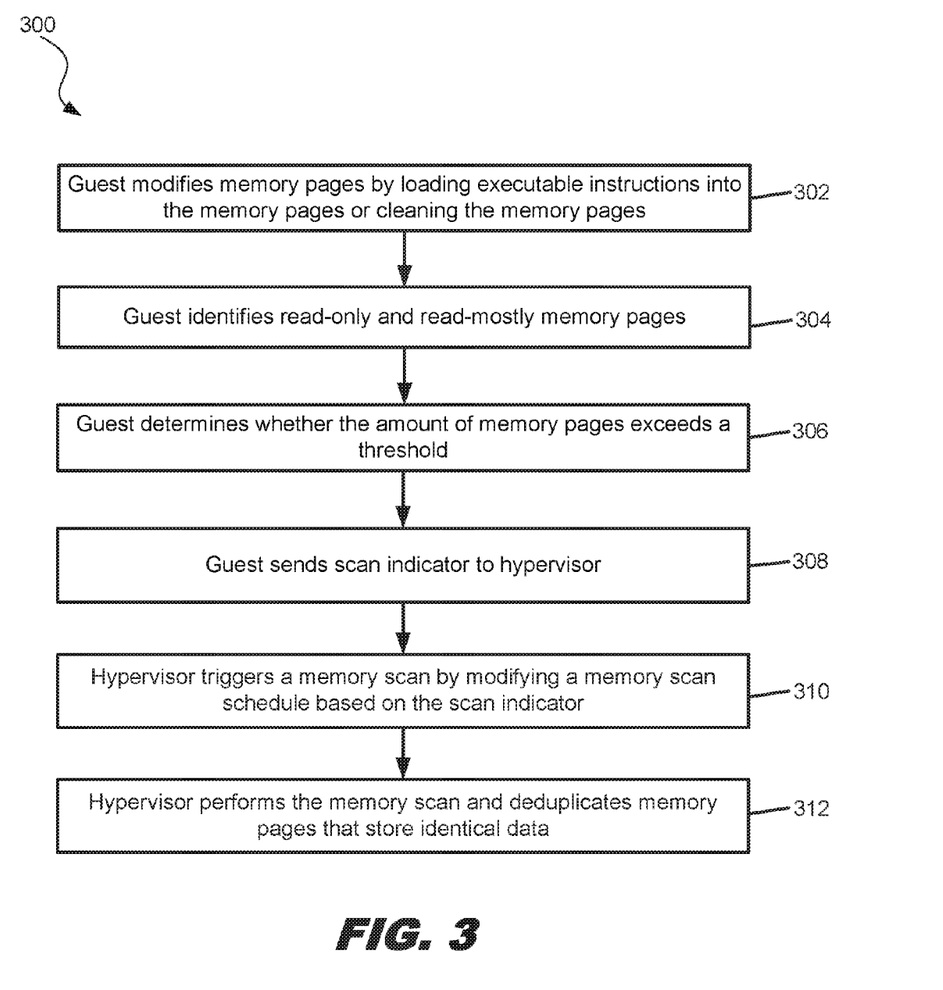
FIG. 3 is a flow diagram illustrating a method for initiating memory page deduplication by a virtual machine guest, in accordance with various examples of the present disclosure.

FIG. 3 is a flow diagram illustrating a method 300 for initiating memory page deduplication by a virtual machine guest, in accordance with various examples of the present disclosure.

At action 302, a virtual machine guest modifies a range of memory pages. In some examples, memory pages are modified by loading executable instructions into the memory pages from executable files and/or library files. In other examples, memory pages are modified by cleaning the memory pages. Memory pages may be cleaned by setting each of the bits in the memory pages to zero, thus erasing any information stored in the memory pages. The memory pages may be cleaned to prepare the memory pages for use by guests of other virtual machines. For example, the hypervisor may provide shared memory that allows memory pages that are assigned to a virtual machine to be included in another virtual machine's guest memory.

At action 304, the guest identifies read-only and read-mostly memory pages. For example, some memory pages may be marked by the guest of the virtual machine as read-only after the instructions are loaded into the memory pages to prevent write-access of the memory pages. The guest may also identify memory pages as read-mostly if the memory pages correspond to system libraries or other files that have a low likelihood of modification. For example, the guest may identify that the executable instructions are read from a file that is stored in a user's home directory. Based on the file location information, the guest may identify that the memory pages are more likely to be modified than if the executable instructions were read from a file located outside of the user's home directory. Accordingly, the memory pages that correspond to a system library or file that is located outside of the user's home directory may be identified as read-mostly, while memory pages corresponding to files in user directories may be identified as non-read-mostly.

At action 306, the guest determines an amount corresponding to the range of modified memory pages and compares the amount to a threshold. In some examples, the amount may include all of the memory pages modified on the virtual machine. In other examples, memory pages modified on the virtual machine may be excluded from the amount. For example, the amount may be measured as a count of the number of memory pages modified that are read-only or read-mostly. In some examples, the amount corresponding to the range of modified memory pages is specified as a count of a number of memory pages modified or as a percentage of memory used by the modified memory pages.

The threshold may be predetermined or user configured. For example, the threshold may be set to 1% of memory or a count of memory pages that occupy 1% of memory. 1% is provided merely as an example and in other examples other thresholds may be used. Accordingly, the virtual machine guest determines whether the amount of memory pages exceeds (or is greater than or equal to) the threshold. In other examples, the virtual machine guest may provide the amount of memory pages to the hypervisor and the hypervisor may compare the amount of memory pages to a threshold. When the comparison is performed by the hypervisor, the hypervisor may aggregate the amounts of memory pages modified on all virtual machines and compare the aggregate amount to a threshold of host memory.

At action 308, if the amount of the memory pages is greater than (or greater than or equal to, in some examples) the threshold, the guest sends a scan indicator to the hypervisor. In some examples, the amount of modified memory pages is included in the scan indicator. In some examples, the range of modified memory pages is included in the scan indicator. In some examples, the range includes the read-only and read-mostly memory pages, but not the non-read-only or non-read-mostly memory pages. The guest may exclude ranges corresponding to non-read-only and non-read-mostly memory pages from the scan indicator to provide the hypervisor with ranges of memory pages that are expected to be modified relatively infrequently or not at all.

At action 310, responsive to/based on receiving the scan indicator from the virtual machine guest, the hypervisor triggers a memory scan. The hypervisor may trigger the memory scan by modifying a memory scan schedule upon receiving the scan indicator to expedite performance of the memory scan. For example, if scan indicators from the guest(s) of the virtual machine and/or other virtual machines indicate that an amount of memory pages modified exceed a threshold, the hypervisor may reduce a time period until a next memory scanning operation is performed. If the hypervisor has not received any scan indicators or if the scan indicators indicate that few memory pages have been modified, the hypervisor may delay performance of the memory scan.

At action 312, the hypervisor performs the memory scan to identify duplicate memory pages and to deduplicate any identified duplicate memory pages. In some examples, the hypervisor accesses information from the scan indicator, such as amount information and/or memory page range information to further tailor the deduplication operations performed. For example, the hypervisor may track information across a plurality of virtual machines, such as the amounts of memory pages modified across the virtual machines, and trigger the memory scanning when an aggregated amount of modified memory pages across all virtual machines exceeds a threshold. Further, the hypervisor may also focus memory scanning operations corresponding to a virtual machine on particular ranges of modified memory pages and exclude from the scanning memory pages that are not included in the particular ranges of modified memory pages. Accordingly, for a particular virtual machine, the hypervisor may perform memory scanning on the ranges of memory pages received in the scan indicator, while excluding scanning of other memory pages corresponding to the virtual machine.

Figure 4:
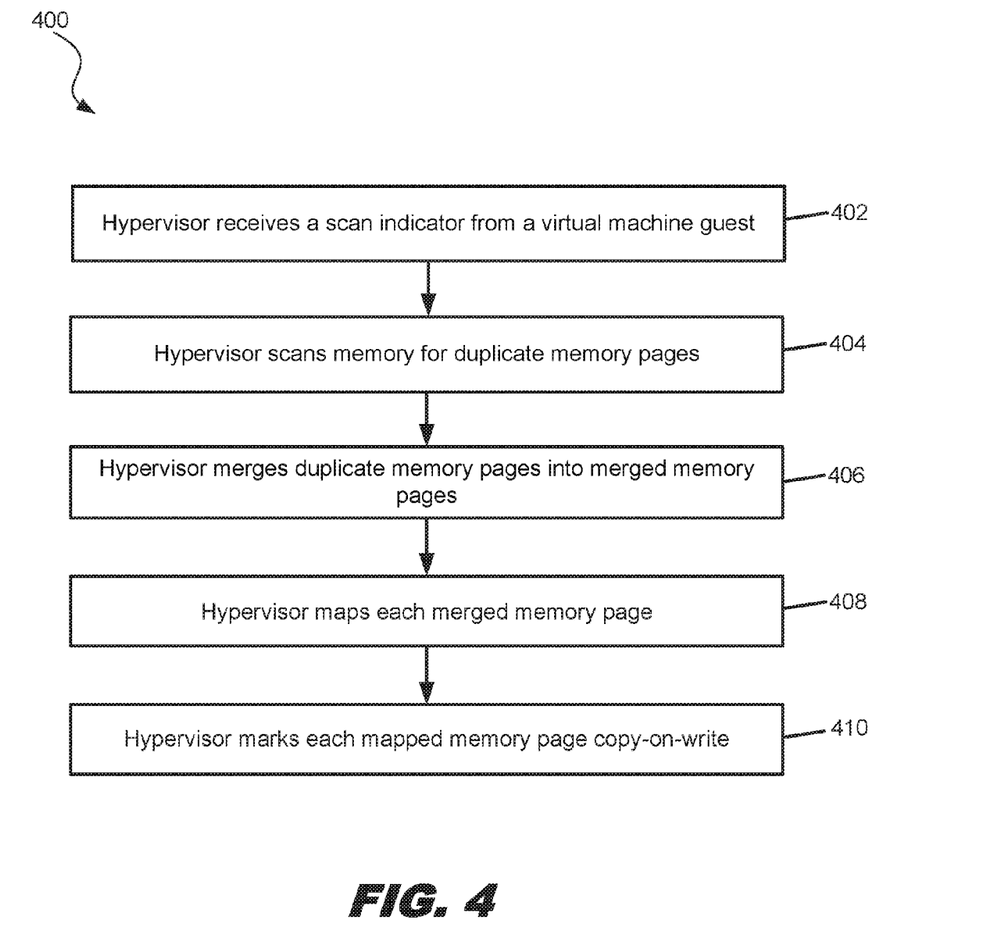
FIG. 4 is a flow diagram illustrating a method for performing memory deduplication at a hypervisor responsive to initiation by virtual machine guests, in accordance with various examples of the present disclosure.

FIG. 4 is a flow diagram illustrating a method 400 for performing memory deduplication at a hypervisor responsive to initiation by virtual machine guests, in accordance with various examples of the present disclosure.

At action 402, a hypervisor receives a scan indicator from a virtual machine guest to initiate deduplication operations performed at the hypervisor. The scan indicator may identify a range of memory pages that have been modified, an amount of memory pages that have been modified, and/or a notification to perform a memory deduplication operation.

At action 404, based on receiving the scan indicator, the hypervisor scans memory of a host machine for duplicate memory pages. In some examples, the hypervisor scans all of the memory pages that are allocated to virtual machines. In other examples, the hypervisor scans a subset of the memory pages allocated to virtual machines. For example, the hypervisor may scan a range of memory pages of a first virtual machine that are identified by the scan indicator and exclude from the scan other pages of the first virtual machine that are not within the range of memory pages. The hypervisor may then compare the contents of the scanned memory pages with the contents of memory pages of the other virtual machines to identify memory pages that include identical content.

At action 406, the hypervisor merges each duplicate memory page into a merged memory page. For example, a plurality of virtual machines may each have a memory page allocated to store an identical portion of data. The hypervisor may identify one of the duplicate memory pages as a memory page to use as the merged memory page and mark the other duplicate memory pages as unused/available for allocation.

At action 408, the hypervisor updates one or more data structures, such as page tables, so that references to the duplicate memory pages are modified to map to/reference each merged memory page. Accordingly, the duplicate memory pages not selected as the merged memory page may be released into a pool of unused memory pages so that they may be re-allocated to store other data.

At action 410, the hypervisor marks each mapped memory page as copy-on-write, such that modifications to each mapped memory page cause the memory page to be duplicated and the modifications to be written to the copy of the memory page. In some examples, the hypervisor marks the mapped memory pages as copy-on-write via a flag in a page table entry corresponding to the mapped memory page. Accordingly, if a virtual machine guest attempts to modify the contents of the mapped memory page, another memory page may be allocated and the modifications may be written to the allocated memory page. The guest memory of the virtual machine may then be mapped, via the page tables, to the memory page that has been allocated to store the modifications.

Figure 5:
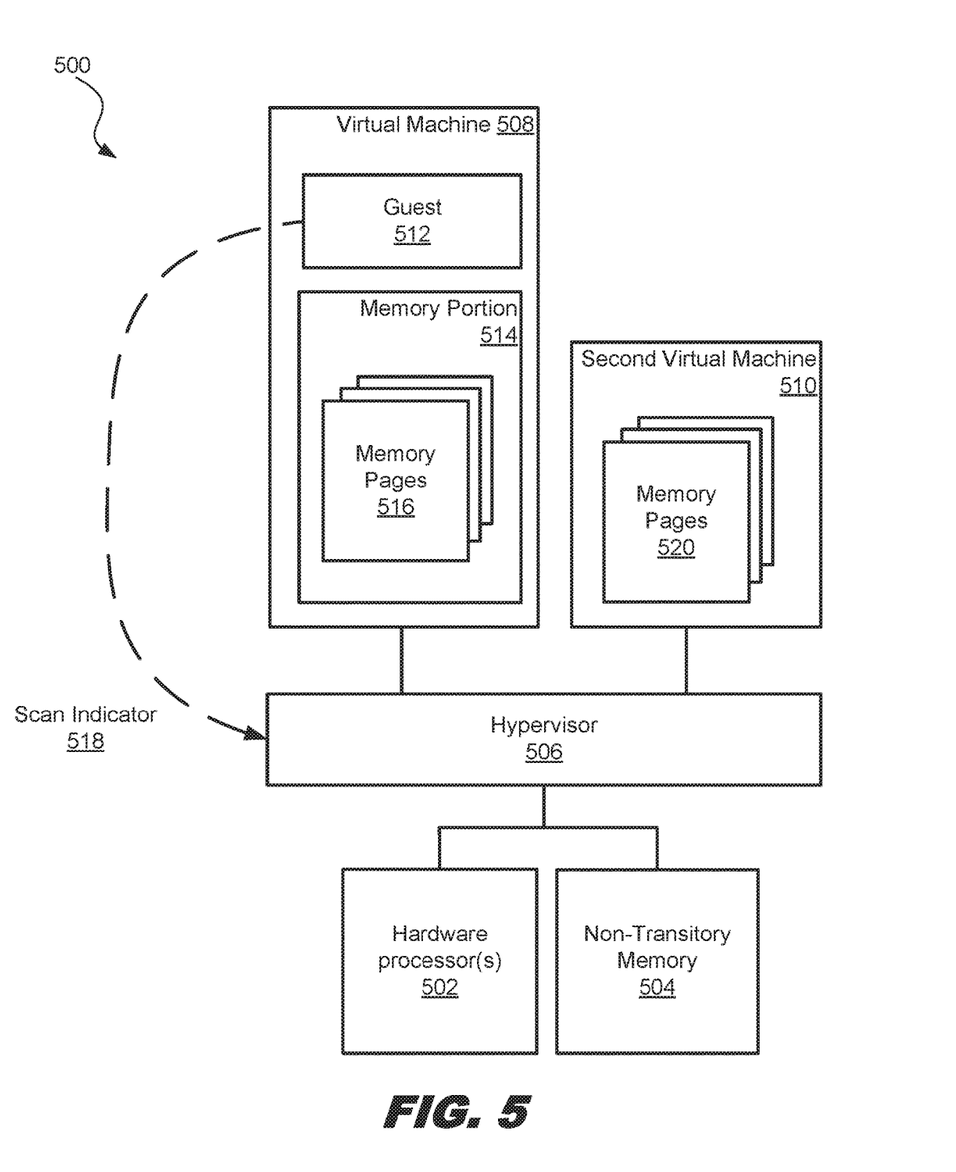
FIG. 5 is an organizational diagram illustrating a system that performs memory deduplication that is initiated by virtual machine guests, in accordance with various examples of the present disclosure.

FIG. 5 is an organizational diagram illustrating a system 500 that performs memory deduplication that is initiated by virtual machine guests, in accordance with various examples of the present disclosure.

The system 500 includes one or more hardware processor(s) 502 and a non-transitory memory 504. The hardware processor(s) 502 are communicatively coupled to the non-transitory memory 504 to read instructions from the non-transitory memory 504 to cause the system to perform operations for deduplicating memory pages. In the present example, the hardware processor(s) 502 include one or more general-purpose processing devices such as a microprocessor, central processing unit, and the like. The non-transitory memory 504 includes a memory device (e.g., a hard disk drive (HDD), solid-state drive (SSD), or other memory) that stores instructions for execution by the hardware processor(s) 502.

The system 500 includes a hypervisor 506 that runs virtual machines 508 and 510. The virtual machine 508 includes a guest 512 and a memory portion 514 that is allocated to the virtual machine 508 by the hypervisor 506. The guest 512 may include any program/software/application that is running on the virtual machine 508. For example, the guest 512 may include one or more of a guest operating system, a kernel, a virtual firmware interface (e.g., BIOS or EFI), a user application, or any other program that is running in a memory space assigned to the virtual machine 508 by the hypervisor 506.

The guest 512 modifies memory pages 516 in the memory portion 514, such as by storing data on the memory pages 516 or cleaning data from the memory pages 516. In the present example, the guest 512 sends a scan indicator 518 to the hypervisor 506 when a threshold amount of the memory portion 514 has been modified. The scan indicator may be structured as a signal, message, variable, interrupt, or other communication that transmits scan-related information from the virtual machine 508 to the hypervisor 506.

Once the hypervisor 506 receives the scan indicator 518, the hypervisor 506 performs a memory scan of the memory pages 516 and the memory pages 520 to identify memory pages that store identical content. When such memory pages are identified, the hypervisor deduplicates the identified memory pages. The deduplicated memory pages may be mapped into a memory space of both the virtual machine 508 and the second virtual machine 510, such that a single copy of data may be read by guests of either virtual machine. Storage capacity is thereby increased by storing a single copy of data and sharing the data between virtual machines rather than storing duplicate copies for each virtual machine.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
providing, by a hypervisor, a virtual machine that is assigned a portion of a memory;
running a guest on the virtual machine;
performing, by the guest, an action which results in modification of the memory;
receiving, by the hypervisor, a scan indicator from the guest of the virtual machine, the scan indicator providing an indication of the memory modified by the performing of the action, wherein the scan indicator is received via a hypercall;
determining, based on the scan indicator exceeding a threshold, that the performing of the action has created duplicates;
triggering, based on the determining, the hypervisor to perform a memory scan to identify memory pages in the portion of memory that store identical data to other memory pages that are assigned to a second virtual machine; and
deduplicating, by the hypervisor, the identified memory pages.

2. The method of claim 1, the method further comprising:
receiving, by the hypervisor, scan indicators from guests of a plurality of virtual machines;
identifying, based on the scan indicators, an aggregate amount of memory corresponding to the virtual machines that has been modified since performing the memory scan;
determining that the aggregate amount of memory exceeds a memory threshold; and
based on the determining, modifying a memory scan schedule.

3. The method of claim 1, further comprising:
  receiving, by the hypervisor, one or more memory page identifiers from the scan indicator;
  locating, by the hypervisor, one or more memory pages corresponding to the one or more memory page identifiers; and
  performing the memory scan on the one or more memory pages.

4. The method of claim 1, the triggering comprising:
  modifying a schedule corresponding to the memory scan to reduce an amount of time until the hypervisor performs the memory scan.

5. The method of claim 1, wherein the virtual machine and the second virtual machine are different virtual machines.

6. The method of claim 1, wherein the virtual machine and the second virtual machine are a same virtual machine.

7. The method of claim 1, wherein the guest performs operations comprising:
  loading executable instructions into one or more memory pages of the portion of the memory or cleaning one or more memory pages of the portion of the memory;
  determining that an amount of memory corresponding to the one or more memory pages exceeds a memory threshold; and
  based on the determining, sending the scan indicator to the hypervisor.

8. The method of claim 7, wherein the one or more memory pages include a first portion of memory pages that are marked read-only and a second portion of memory pages that are not marked read-only,
  wherein the determined amount of memory includes memory used by the first portion of memory pages, and
  wherein the determined amount of memory does not include memory used by the second portion of memory pages.

9. A non-transitory machine-readable medium having stored thereon machine-readable instructions executable to cause a machine to perform operations comprising:
  providing, by a hypervisor, a virtual machine that is assigned a portion of a memory;
  running a guest on the virtual machine;
  performing, by the guest, an action which results in modification of the memory;
  receiving, by the hypervisor, a scan indicator from the guest of the virtual machine, the scan indicator providing an indication of the memory modified by the performing of the action, wherein the scan indicator is received via a hypercall;
  determining, based on the scan indicator exceeding a threshold, that the performing of the action has created duplicates;
  triggering, based on the determining, the hypervisor to perform a memory scan to identify memory pages in the portion of memory that store identical data to other memory pages that are assigned to a second virtual machine; and
  deduplicating, by the hypervisor, the identified memory pages.

10. The non-transitory machine-readable medium of claim 9, the operations further comprising:
  cleaning one or more memory pages of the portion of the memory;
  determining that an amount of memory corresponding to the one or more memory pages exceeds a memory threshold; and
  based on the determining, sending the scan indicator to the hypervisor.

11. The non-transitory machine-readable medium of claim 9, the operations further comprising:
  receiving, by the hypervisor, one or more memory page identifiers from the scan indicator;
  locating, by the hypervisor, one or more memory pages corresponding to the one or more memory page identifiers; and
  performing the memory scan on the one or more memory pages.

12. The non-transitory machine-readable medium of claim 9, the triggering comprising:
  modifying a schedule corresponding to the memory scan to reduce an amount of time until the hypervisor performs the memory scan.

13. The non-transitory machine-readable medium of claim 9, the operations further comprising:
  loading executable instructions from a library or an executable file into one or more memory pages of the portion of the memory;
  determining that an amount of memory corresponding to the one or more memory pages exceeds a memory threshold; and
  based on the determining, sending the scan indicator to the hypervisor.

14. The non-transitory machine-readable medium of claim 13, wherein the one or more memory pages include a first portion of memory pages that are marked read-only and a second portion of memory pages that are not marked read-only,
  wherein the determined amount of memory includes memory used by the first portion of memory pages, and
  wherein the determined amount of memory does not include memory used by the second portion of memory pages.

15. A system comprising:
  a non-transitory memory; and
  one or more hardware processors coupled to the non-transitory memory that read instructions from the non-transitory memory to cause the system to perform operations comprising:
    providing, by a hypervisor, a virtual machine that is assigned a portion of a memory;
    running a guest on the virtual machine;
    performing, by the guest, an action which results in memory modification;
    sending, by the guest of the virtual machine, a scan indicator to the hypervisor via a hypercall, the scan indicator providing an indication of the memory modified by the performing of the action;
    receiving, by the hypervisor, the scan indicator from the guest of the virtual machine;
    determining, based on the scan indicator exceeding a threshold, that the performing of the action has created duplicates;
    triggering, based on the determining, the hypervisor to perform a memory scan to identify memory pages in the portion of memory that store identical data to other memory pages that are assigned to a second virtual machine; and
    deduplicating, by the hypervisor, the identified memory pages.

16. The system of claim 15, the operations further comprising:
  cleaning one or more memory pages of the portion of the memory;

determining that an amount of memory corresponding to the one or more memory pages exceeds a memory threshold; and based on the determining, sending the scan indicator to the hypervisor.

17. The system of claim 15, the operations further comprising:

receiving, by the hypervisor, one or more memory page identifiers from the scan indicator;

locating, by the hypervisor, one or more memory pages corresponding to the one or more memory page identifiers; and performing the memory scan on the one or more memory pages.

18. The system of claim 15, the triggering comprising:

modifying a schedule corresponding to the memory scan to reduce an amount of time until the hypervisor performs the memory scan.

19. The system of claim 15, the operations further comprising:

loading executable instructions from a library or an executable file into one or more memory pages of the portion of the memory;

determining that an amount of memory corresponding to the one or more memory pages exceeds a memory threshold; and based on the determining, sending the scan indicator to the hypervisor.

20. The system of claim 19, wherein the one or more memory pages include a first portion of memory pages that are marked read-only and a second portion of memory pages that are not marked read-only, wherein the determined amount of memory includes memory used by the first portion of memory pages, and wherein the determined amount of memory does not include memory used by the second portion of memory pages.

* * * * *